I. CERPIAL.
BELT FASTENER.
APPLICATION FILED MAR. 17, 1917.
1,259,360.
Patented Mar. 12, 1918.
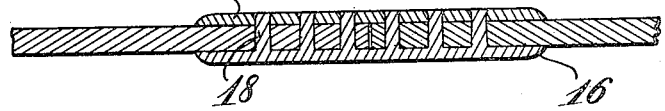
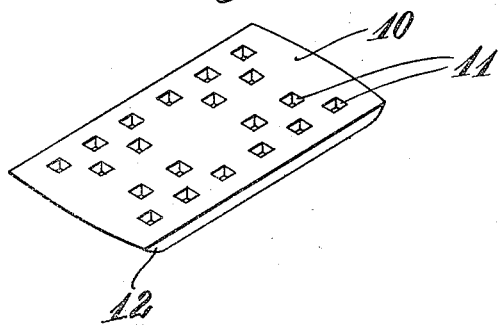
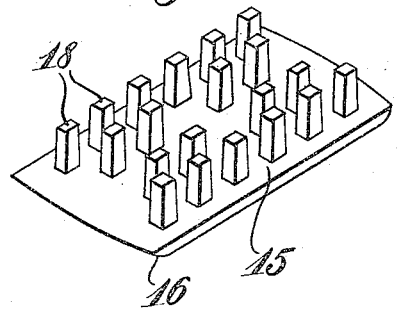
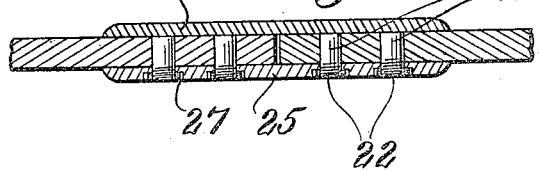
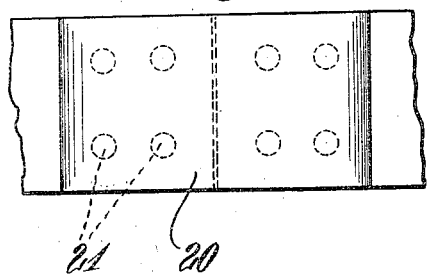
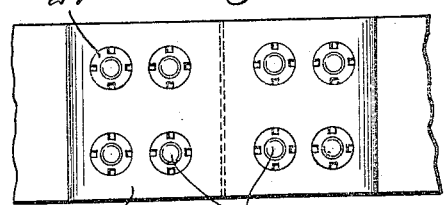
Inventor
Ignacy Cerpial
By his Attorney
Oscar Geier

UNITED STATES PATENT OFFICE.

IGNACY CERPIAL, OF SOUTH BEND, INDIANA.

BELT-FASTENER.

1,259,360.

Specification of Letters Patent. Patented Mar. 12, 1918.

Application filed March 17, 1917. Serial No. 155,470.

*To all whom it may concern:*

Be it known that I, IGNACY CERPIAL, a subject of the Czar of Russia, resident of South Bend, county of St. Joseph, and State of Indiana, have invented certain new and useful Improvements in Belt-Fasteners, of which the following is a specification.

This invention relates to improvements in belt fasteners, and has as its principal object the provision of means whereby the two ends of a belt may be securely and rapidly joined.

A further object is to provide means whereby, should it become desirable, the ends of the belt may be separated without destruction of the same or the attachment by which they are engaged.

These and other like objects are attained by the novel design, construction and combination of parts hereafter described and shown in the accompanying drawing, forming a material part of this specification, and in which:—

Figure 1 is a transverse sectional view taken through a belt and showing the application of one form of the invention.

Fig. 2 is a perspective view looking from the inner side of one of the connecting plates.

Fig. 3 is a similar perspective view showing the other connecting plate.

Fig. 4 is a transverse sectional view similar to that of Fig. 1, but showing a modification of parts.

Fig. 5 is a top plan view of the same, and Fig. 6 is a bottom plan view of the same.

In the form shown in Figs. 1, 2 and 3, an upper, perforate plate 10 is provided with a plurality of rectangular perforations 11, the plate being formed with rounded edges 12 and slightly curved so as to conform to the belt and pulleys over which the belt may pass.

The oppositely disposed plate 15 is similarly formed with beveled edges 16 and has upon its contacting surface a plurality of rectangular spurs or projections 18, the same registering with the openings 11 in the plate 10.

In operation, the plate 15 is applied to one side of the belt so that the spurs 18 project therethrough, and engaged in the openings 11 of the opposite plate, whereupon the ends of the spurs 18 are riveted over at the top holding both plates tightly against the side of the belt and securely clamping the ends.

In the modification shown in Figs. 4, 5 and 6, a slightly different arrangement is shown in which one of the plates 20 has either formed with it or secured to it a plurality of studs 21, extending outwardly from one side and provided with threaded ends 22, the same being adapted to pass through the perforate openings in the oppositely disposed plate 25, the openings being counterbored and receptive of nuts 27, by means of which the studs 21 are engaged, holding the two plates 20 and 25 rigidly together and clamping the belt securely between.

In both forms of the device shown, it is to be understood that it is not so much the projection or pin which holds the belt ends in relation with each other, as the clamping effect of the plates, disposed upon both sides of the belt, and it will be obvious that no outstanding parts are formed with the plates thereby causing damage to the operator by reason of catching in the hand or clothing.

Having thus described my invention, what I claim as new, and desire to secure by Letters Patent, is:—

In a belt fastener, the combination with a flexible plate having a plurality of equally spaced openings formed therethrough, said openings being counterbored on one side, a second flexible plate, a plurality of threaded stems projecting from said second plate, said stems registering with the mentioned openings in said first plate and nuts in the mentioned openings engageable with said studs whereby said plates are clamped positively in engagement against the surface of the belt.

In testimony whereof I have affixed my signature this 27th day of February, 1917.

IGNACY CERPIAL.

Copies of this patent may be obtained for five cents each, by addressing the "Commissioner of Patents. Washington, D. C."